United States Patent [19]
Headrick et al.

[11] Patent Number: 4,772,495
[45] Date of Patent: Sep. 20, 1988

[54] TROWELABLE ABLATIVE COATING COMPOSITION AND METHOD OF USE

[75] Inventors: Stephen E. Headrick, Huntsville; Roger L. Hill, Decatur, both of Ala.

[73] Assignee: United Technologies Corporation, Hartford, Conn.

[21] Appl. No.: 76,971

[22] Filed: Jul. 23, 1987

[51] Int. Cl.⁴ .............................................. B32B 15/00
[52] U.S. Cl. ................................... 427/386; 523/179; 523/219; 521/54; 521/84.1; 521/85; 521/102; 521/178; 521/907; 264/45.3
[58] Field of Search ............... 427/386; 523/179, 219; 521/54, 84, 85, 907, 102, 178; 264/45.3

[56] References Cited
U.S. PATENT DOCUMENTS

| | | | |
|---|---|---|---|
| 4,031,059 | 6/1977 | Strauss | 523/179 |
| 4,070,020 | 1/1978 | Darro | 264/45.3 |
| 4,077,921 | 3/1978 | Sharpe et al. | 523/179 |
| 4,124,670 | 11/1978 | Cecka et al. | 264/45.3 |
| 4,129,634 | 12/1978 | Cecka et al. | 264/45.3 |
| 4,595,714 | 6/1986 | McAllister et al. | 523/179 |

Primary Examiner—Morton Foelak
Attorney, Agent, or Firm—Harry J. Gwinnell

[57] ABSTRACT

A trowelable ablative coating composition is disclosed. The composition comprises an epoxy resin, an amide curing agent, glass microspheres and ground cork. A method for protecting a substrate is also disclosed. The method comprises applying the trowelable ablative coating discussed above to a substrate and curing the coating composition.

2 Claims, 1 Drawing Sheet

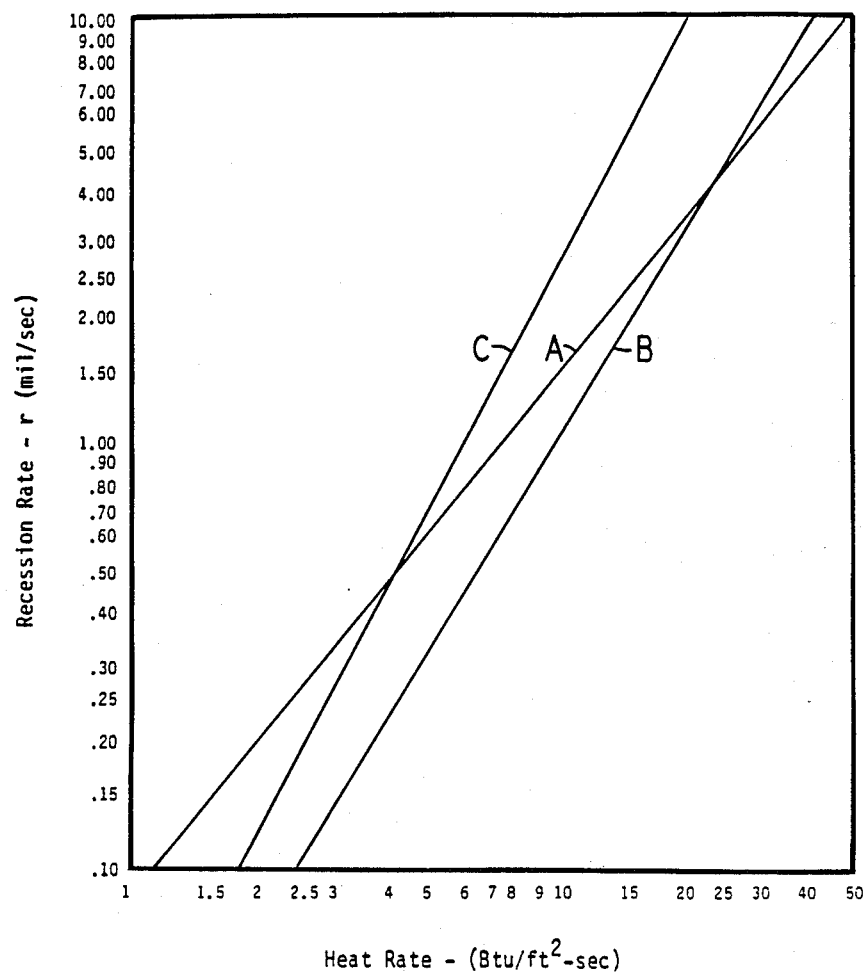

TROWELABLE ABLATIVE COATING COMPOSITION AND METHOD OF USE

The invention described herein was made in the performance of work under NASA Contract No. NAS 8-36100 and is subject to the provisions of Section 305 of the National Aeronautics and Space Act of 1958 (72 Stat. 435; 42 U.S.C. 2457).

DESCRIPTION

1. Technical Field

The field of art to which this invention pertains is synthetic coating compositions.

2. Background Art

Ablative materials are used as heat shields to protect space vehicles as they are subjected to high velocity, high temperature conditions during launch and during re-entry to the earth's atmosphere. Such materials need exhibit good adhesion to the substrate, be flexible enough to provide thermal strain stability, have good thermal stability and have low thermal conductivity.

Ablative materials in current use may be roughly categorized as either solid materials or cured-in-place coating compositions. Cured-in-place ablative coating compositions may be either low viscosity compositions for a spray application or high viscosity compositions for hand trowel application.

Solid coverings (e.g. cork sheet or ceramic blocks) must be conformed and adhered to the substrate to be protected. Fabrication of a smooth covering from solid ablative materials and removal of the charred covering from the spacecraft after re-entry are difficult, time consuming and expensive processes.

Spray applied coating compositions such as that disclosed in U.S. Pat. No. 4,077,921 have overcome some of the difficulties associated with solid coverings, but are not applicable in all situations. Solid ablative material such as cork sheet is still used to protect protuberant structures and high viscosity ablative coating compositions are used for close-out and repair of primary ablative layers.

Conventional high viscosity ablative coating compositions are each deficient in some significant respect (e.g. high cost, short pot life or hazardous ingredients).

What is needed in this art is an ablative coating composition that overcomes the above limitations.

DISCLOSURE OF INVENTION

A trowelable ablative coating composition is disclosed. The composition comprises about 67 weight percent to about 73 weight percent of a mixture of an epoxy resin and an amide curing agent, about 22 weight percent to about 28 weight percent glass microspheres, and about 4.5 weight percent to about 5.5 weight percent ground cork. The quantity of the amide curing agent is equal to the quantity of the epoxy resin times a factor between 0.97 and 1.03.

A further aspect of the disclosure involves a method for protecting a substrate in a high temperature, high velocity, erosive environment. The method comprises applying the trowelable ablative coating composition discussed above to the substrate and curing the composition.

The foregoing and other features and advantages of the present invention will become more apparent from the following description and accompanying drawings.

BRIEF DESCRIPTION OF THE DRAWINGS

The FIGURE shows the recession rate of the ablative coating of the present invention and of an exemplary conventional coating versus the heating rate.

BEST MODE FOR CARRYING OUT THE INVENTION

The mixture of epoxy resin and amide curing agent of the present invention may be of any epoxy resin and any curing agent, combined in any proportion that provides the required pot life, cures at ambient temperature and imparts the required strength, adhesion, hardness, and thermal stability to the cured trowelable ablative coating composition.

Epichlorohydrin/bisphenol A type epoxy resins are preferred. An epichlorohydrin/bisphenol A epoxy resin that was found to be particularly suitable for the practice of the present invention is known as Scotch-Weld® Epoxy Adhesive 2216B (Translucent) manufactured by 3M Corporation.

Amide curing agents are preferred. An amide curing agent found to be particularly suitable for the practice of the present invention is Scotch-Weld® Epoxy Adhesive 2216A (Translucent) manufactured by 3M Corporation.

It is preferred that the mixture of epoxy resin and amide curing agent comprise between about 67 weight percent and about 73 weight percent of the ablative coating composition, and most preferred that the mixture comprise between about 69 weight percent and about 71 weight percent of the composition. It is preferred that the quantity by weight of amide curing agent in the mixture be equal to the quantity by weight of epoxy resin in the mixture multiplied by a factor between about 0.97 and about 1.03 and is most preferred that the quantity by weight of amide curing agent be equal to the quantity by weight of epoxy resin multiplied by a factor between about 0.99 and about 1.01.

The glass microspheres of the present invention may be any hollow discrete spheres of alkali metal silicate glass that impart the desired low density and increased flame resistance to the coating composition. Sodium borosilicate glass microspheres with a particle size between about 20 microns and about 200 microns and a bulk density between 0.185 grams/cubic centimeter (g/cm$^3$) and 0.195 g/cm$^3$ are preferred. Commercially available glass microspheres that were found to be suitable for the practice of the present invention are known as IG-101 Glass Eccospheres, manufactured by Emerson and Cuming. The glass microspheres should comprise between about 22 weight percent and about 28 weight percent of the coating composition and most preferably comprise between about 24 weight percent and about 26 weight percent of the composition. It is preferred that the glass spheres be packaged and stored in a manner to protect them against moisture absorption.

The ground cork of the present invention may be any ground cork that imparts the desired low density and low thermal conductivity to the coating composition. It is preferred that the particle size of the ground cork be such that it will pass through a 20 mesh screen yet be retained on a 40 mesh screen. A suitable ground cork is known as Granulated Cork, 20/40 Screen, manufactured by Sheller Globe, Incorporated. It is preferred that the ground cork comprise between about 4.5 weight percent to about 5.5 weight percent of the coating composition, and most preferred that the ground cork comprise between 4.8 weight percent and 5.2 weight percent to the coating composition. It is preferred that the cork be packaged and stored in a manner to protect it against moisture absorption.

The elements of the coating composition of the present invention must be thoroughly mixed to obtain a homogeneous mixture. The coating composition of the present invention may be mixed using conventional mixing equipment of convenient size, such as a Hobart mixer, manufactured by Hobart Corporation. To insure proper cure, the epoxy and curing agent should be mixed together briefly prior to adding the glass microspheres and ground cork filler materials. It is preferred that the epoxy resin and curing agent be mixed for a time period between about 30 seconds and about 60 seconds prior to the addition of the filler materials. It is preferred that the composition be mixed for an additional time period of between about 3 minutes and about 5 minutes after addition of the filler materials.

The coating composition is self-curing at room temperature, and the rate of cure is sensitive to both temperature and relative humidity. For example, the composition has a pot life or working time of about 90 minutes in a controlled environment at a temperature between 72° F. and 76° F. with the relative humidity between 50% and 60%. As a further illustration, in an uncontrolled environment at a temperature between 85° F. and 95° F. with a relative humidity of between 70% and 80% in direct sunlight, the composition has a pot life of about 45 minutes. The curing reaction continues for several days at room temperature and is complete within 8 to 10 days.

The coating composition may be applied by hand troweling or molded during a time period less than or about equal to the pot life of the material discussed above.

EXAMPLE I

The substrate panels were fabricated from $\frac{1}{8}$ inch thick 2219-T87 aluminum cut to 12 inch×12 inch panels. The surfaces of the panels were cleaned with perchloroethylene, chromate conversion coated, primed (Sikken Primer No. 463-6-3) and painted (Sikken's Topcoat No. 443-3-1). The painted surfaces were lightly cross-hatch sanded with 100 grit sandpaper and wiped clean with perchloroethylene.

A trowelable ablative coating composition, known as Booster Trowelable Ablative (BTA), comprising 35% by weight epoxy resin (Scotch-Weld 2216B), 35% by weight amide curing agent (Scotch-Weld 2216A), 25% by weight glass microspheres (IG-101 Glass Eccospheres) and 5% by weight Granulated Cork (20/40 screen) was mixed in a Hobart mixer. The curing agent and epoxy resin were added to the Hobart mixer and mixed for 45 seconds. The glass spheres and cork were added to the mixer and the composition was then mixed for an additional 3 minutes.

The trowelable ablative coating composition was applied to the substrate panels by hand troweling. Even distribution was obtained by seating the substrate within a 12 inch×12 inch frame and then applying and leveling the coating composition. The panels were allowed to cure for 24 hours at ambient temperature before the frame was removed and allowed to cure for a total of 10 days before further testing. Test panels were then cut into test specimens of appropriate size as discussed below. Each specimen was sanded level and smoothed with minimal material removal, and then brushed clean of sanding residue.

Tensile specimens were cut from the test panels. The specimens were tested with a Satec System tensile tester at 75° F. at a crosshead speed of 0.05 inch per minute. The total load at failure was used to determine the tensile strength. Average tensile values, in pounds/square inch (psi), for 30 2"×2" specimens with $\frac{1}{2}$" thick layers of coating are presented in Table 1. The majority of failures occurred at the primer/topcoat interface, indicating that the cohesive strength and adhesion of the coating composition to the topcoat is stronger than the adhesion between the primer and the topcoat.

Density values were calculated from weight and volume measurements. Linear density was calculated by measuring the dimensions of a specimen at five separate locations for each dimension to obtain average dimensions and weighing the specimens on an analytical balance. After weighing, the coating composition was removed from the substrate leaving primer and paint intact. The substrate was weighed and measured for the final calculation. The average, in pounds/cubic foot, (lb/ft$^3$), of two linear density measurements are presented in the Table 1.

The hardness of the cured coating was measured using a Shore "C" durometer. These readings were obtained from each of the tensile samples before tensile testing. Average hardness values are presented in Table 1.

Parallel testing was performed using an exemplary conventional trowelable ablative coating (MTA-2). Results are also listed in Table 1.

TABLE 1

|  | BTA | MTA-2 |
| --- | --- | --- |
| tensile strength (psi) | 602 | 478 |
| density (lb/ft$^3$) | 31.0 | 35.0 |
| hardness (Shore "C") | 75 | 75 |

The trowelable ablative of the present invention (BTA) exhibited a higher tensile strength and a lower density than the conventional trowelable ablative (MTA-2).

EXAMPLE II

The ablative coating of the present invention protects an underlying substrate by gradual charring and recession when subjected to high temperature, high velocity erosive environments. Testing was performed to characterize the rate at which the ablative coating of the present invention recedes under various conditions and to verify the ability of the coating to protect a substrate under simulated re-entry conditions.

A trowelable ablative coating composition was formulated mixed as in Example I. A 0.5" thick layer of the coating was applied by hand trowel to each of eight 20"×20"×$\frac{1}{8}$" aluminum substrates according to the method described in Example I. A 0.5" thick layer of coating was applied to each of four 20"×20"×$\frac{1}{8}$" aluminum substrates by injecting the coating between the substrate and a covering mold.

Each of the specimens was mounted on the top surface of a 34" long×12" wide water cooled wedge shaped fixture for testing. Each specimen was subjected to high velocity (MACH 4), high temperature (1440° F.) conditions in a high velocity wind tunnel at each of four heating rates (10 BTU/ft$^2$-sec, 20 BTU/ft$^2$-sec, 30 BTU/ft$^2$-sec and 40 BTU/ft$^2$-sec). The apex of the wedge shaped fixture was oriented toward the wind source and the heating rate was varied by varying the angle of the fixture with respect to the air flow. A second wedge shaped member, known as a "shock generator", was positioned above the surface of the specimen. The angle of the shock generator with regard to the airstream was adjusted to deflect the airstream downward toward the surface of the specimen and more intensely heat a narrow band of the specimen to achieve the 30 BTU/ft$^2$-sec and 40 BTU/ft$^2$-sec heating rates. The thickness of the coating layer was periodically measured with an electronic displacement measuring system. Recession rate was calculated as the difference between the initial thickness of uncharred coating and the final thickness of uncharred coating divided by the duration of exposure to a particular heating rate.

Design curves relating recession rate to heating rate were generated for troweled BTA specimens, for molded BTA specimens, and for troweled MTA-2 specimens. These curves were of the form:

$$\dot{r} = x\dot{q}^y,$$

where $\dot{r}$ = recession rate in (mil/sec) and $\dot{q}$ = heating rate in (BTU/ft$^2$-sec). The x and y coefficients for each material are listed in Table 2.

TABLE 2

|  | x | y |
|---|---|---|
| troweled BTA | 0.08824 | 1.219 |
| molded BTA | 0.02439 | 1.621 |
| troweled MTA-2 | 0.03342 | 1.89 |

The design curves are shown in the FIGURE, where curve A is the design curve for troweled BTA, curve B is the design curve for molded BTA, and curve C is the design curve for troweled MTA-2. It should be noted that within the range of heating rates of interest, (i.e. 10 BTU/ft$^2$-sec to 40 BTU/ft$^2$-sec), the design curves for the trowelable ablative of the present invention (BTA) fall below those for the conventional trowelable ablative (MTA-2), and indicate a lower recession rate for the BTA at a given heating rate.

The design results were verified by subjecting troweled BTA specimens and molded BTA specimens to a sequence of conditions simulating launch and re-entry. All verification points fell below the respective design curves and none of the verification specimens exhibited substrate exposure.

The ablative coating of the present invention has a low cost and poses minimal health hazard. The uncured coating composition has a long pot life, may be applied by hand troweling or molding procedures, and cures at room temperature. The cured coating exhibits low density, high adhesion and high tensile strength. The coating protects an underlying substrate by providing a layer of insulation that slowly erodes by gradual charring and recession when exposed to high temperature, high velocity environments.

Although this invention has been shown and described with respect to detailed embodiments thereof, it will be understood by those skilled in the art that various changes in form and detail thereof may be made without departing from the spirit and scope of the claimed invention.

We claim:

1. A method of protecting a substrate under high temperature, high velocity, erosive conditions, comprising applying to the substrate a trowelable ablative coating composition consisting essentially of about 67 weight percent to about 73 weight percent of a mixture of an epoxy resin consisting of an epichlorohydrin/bisphenol A reaction product and an amide curing agent wherein the quantity by weight of the amide curing agent is equal to the quantity by weight of the epoxy resin multiplied by a factor between about 0.97 and about 1.03, about 22 weight percent to about 28 weight percent hollow glass microspheres, and about 4.5 weight percent to about 5.5 weight percent ground cork, and curing the composition.

2. The method of claim 1 wherein the glass microspheres comprise sodium borosilicate glass microspheres having a diameter between about 20 microns and about 200 microns and a bulk density of about 0.158 g/cm$^3$ and about 0.195 g/cm$^3$.

* * * * *

UNITED STATES PATENT AND TRADEMARK OFFICE
CERTIFICATE OF CORRECTION

PATENT NO. : 4,772,495

DATED : September 20, 1988

INVENTOR(S) : Stephen E. Headrick & Roger L. Hill

It is certified that error appears in the above-identified patent and that said Letters Patent is hereby corrected as shown below:

Title page:

"Assignee:" should be --USBI Booster Production Company, Inc. Huntsville, AL--

Column 6, line 41 "0.158" should be --0.185--

Signed and Sealed this

Twenty-first Day of March, 1989

Attest:

DONALD J. QUIGG

Attesting Officer

Commissioner of Patents and Trademarks